United States Patent
Morla

(10) Patent No.: US 9,371,936 B2
(45) Date of Patent: Jun. 21, 2016

(54) BALANCED GLOBE VALVE ASSEMBLY

(71) Applicant: SCHNEIDER ELECTRIC BUILDINGS, LLC, Palatine, IL (US)

(72) Inventor: Chaitanya Morla, Loves Park, IL (US)

(73) Assignee: SCHNEIDER ELECTRIC BUILDINGS, LLC, Palatine, IL (US)

(*) Notice: Subject to any disclaimer, the term of this patent is extended or adjusted under 35 U.S.C. 154(b) by 0 days.

(21) Appl. No.: 14/488,939

(22) Filed: Sep. 17, 2014

(65) Prior Publication Data

US 2016/0076669 A1    Mar. 17, 2016

(51) Int. Cl.
*F16K 39/02*  (2006.01)
*F16K 1/30*   (2006.01)
*F16K 1/36*   (2006.01)
*F16K 47/04*  (2006.01)

(52) U.S. Cl.
CPC ............. *F16K 39/022* (2013.01); *F16K 1/30* (2013.01); *F16K 1/36* (2013.01); *F16K 47/04* (2013.01); *Y10T 137/86734* (2015.04); *Y10T 137/86759* (2015.04)

(58) Field of Classification Search
CPC ........... F16K 39/022; F16K 1/36; F16K 1/30; F16K 47/04; F16K 41/04; F16K 41/02; Y10T 137/86734; Y10T 137/86759
USPC ........... 251/282, 325, 214; 137/625.3, 625.33
See application file for complete search history.

(56) References Cited

U.S. PATENT DOCUMENTS

| | | | |
|---|---|---|---|
| 1,540,529 A | 6/1925 | Blaisdell | |
| 1,764,991 A | 6/1930 | Siebs | |
| 2,622,763 A | 12/1952 | MacGregor | |
| 3,213,887 A | 10/1965 | Angelery | |
| 3,290,003 A | 12/1966 | Kessler | |
| 3,430,919 A | 3/1969 | Frazier | |
| 3,472,269 A | 10/1969 | Scholle | |
| 3,532,109 A | 10/1970 | Smith | |
| 3,572,382 A * | 3/1971 | Luthe | F16K 39/022 251/282 |
| 3,575,213 A | 4/1971 | Schnall | |
| 3,648,718 A * | 3/1972 | Curran | F16K 1/465 251/282 |
| 3,838,707 A | 10/1974 | Wachowitz, Jr. | |
| 3,958,275 A | 5/1976 | Morgan et al. | |
| 3,990,475 A * | 11/1976 | Myers | F16K 3/34 137/625.3 |
| 4,237,936 A | 12/1980 | Lollis et al. | |
| 4,436,105 A | 3/1984 | Goans | |
| 4,570,665 A | 2/1986 | Zimmerly | |
| 4,693,451 A | 9/1987 | Tricini | |
| 5,288,052 A | 2/1994 | Black et al. | |

(Continued)

OTHER PUBLICATIONS

Notification of Transmittal of the International Search Report and the Written Opinion of the International Searching Authority from corresponding PCT/US2015/050444 dated Dec. 17, 2015.

*Primary Examiner* — John Bastianelli
(74) *Attorney, Agent, or Firm* — Lando & Anastasi, LLP

(57) ABSTRACT

A balanced globe valve assembly includes a housing having an inlet and an outlet and a cage disposed within the housing between the inlet and the outlet. The cage includes a valve seat and at least one port formed therein. The balanced globe valve assembly further includes a valve member disposed within the cage and coupled to the housing. The valve member is movable within the cage between an open position in which the valve member is spaced from the valve seat and a closed position in which the valve member is seated within the valve seat so that the valve member blocks the at least one port. The valve member has a small opening formed therein to balance the valve member.

17 Claims, 7 Drawing Sheets

(56) References Cited

U.S. PATENT DOCUMENTS

| | | | |
|---|---|---|---|
| 5,365,759 A | 11/1994 | Bonomi | |
| 5,772,182 A * | 6/1998 | Stambaugh, Sr. | F02C 7/232 251/325 |
| 6,206,024 B1 | 3/2001 | Naberhaus | |
| 6,394,135 B2 | 5/2002 | Erickson et al. | |
| 6,851,658 B2 * | 2/2005 | Fitzgerald | F16K 3/243 251/282 |
| 7,017,608 B2 | 3/2006 | Erickson et al. | |
| 7,083,160 B2 | 8/2006 | Baumann | |
| 7,159,617 B2 | 1/2007 | Erickson et al. | |
| 7,721,753 B2 * | 5/2010 | Wears | F16K 1/48 251/366 |
| 7,926,784 B2 * | 4/2011 | Fleming | F16K 47/08 251/282 |
| 2005/0012065 A1 * | 1/2005 | Baumann | F16K 39/022 251/282 |
| 2009/0320931 A1 * | 12/2009 | Wears | F16K 47/08 137/15.18 |
| 2010/0270491 A1 * | 10/2010 | Faas | F16J 15/3236 251/366 |
| 2011/0240901 A1 | 10/2011 | Evertz et al. | |
| 2012/0068099 A1 | 3/2012 | Sealy | |
| 2012/0211688 A1 | 8/2012 | Carlson et al. | |

* cited by examiner

BALANCED GLOBE VALVE ASSEMBLY

BACKGROUND

1. Field of Disclosure

The present disclosure relates generally to valves, and more particularly to globe valves that are used in HVAC systems.

2. Discussion of Related Art

In heating, ventilation, and air conditioning (HVAC) systems, globe valves are used for applications requiring throttling and shut off with an actuator that provides an operating force to aid in closing and opening of the valve as required. The force required to operate a typical valve depends on many factors, such as valve size, operating pressure, and sealing design, for example.

A typical globe valve includes a generally spherical body with two halves of the spherical body being separated by an internal baffle, which has an opening formed therein. The opening creates a valve seat in which a movable valve or plug is seated. An actuator, either manual or automatic, can be used to manipulate the movement of the plug to open and close the valve.

FIG. 1 illustrates an unbalanced globe valve 2 having a solid plug 4. Although presently available unbalanced globe valves may perform efficiently, such valves require large forces to operate, thereby demanding a stronger and more expensive actuator. With an unbalanced globe valve 2, the force needed to close-off the plug 4 is dependent primarily on the pressure exerted on the area of the plug. Due to these system operation pressures in the system, an actuator must provide a sufficient force to move the plug. Unbalanced globe valves having solid plugs are relatively simple in design, and are primarily used when smaller valve sizes are required.

FIG. 2 illustrates a balanced valve 6 having a plug 8, which has large cavities formed in the plug to enable fluid to flow through the plug. Balanced globe valves having plugs with large cavities or openings are more complex in design, and are primarily used when larger valves are required. Reference can be made to U.S. Pat. No. 7,017,608, which discloses a balanced globe valve design.

SUMMARY OF DISCLOSURE

One aspect of the present disclosure is directed to a balanced globe valve assembly comprising a housing having an inlet and an outlet and a cage disposed within the housing between the inlet and the outlet. The cage includes a valve seat and at least one port formed therein. The balanced globe valve assembly further comprises a valve member disposed within the cage and coupled to the housing. The valve member is movable within the cage between an open position in which the valve member is spaced from the valve seat and a closed position in which the valve member is seated within the valve seat so that the valve member blocks the at least one port. The valve member has a small opening formed therein to balance the valve member.

Embodiments of the balanced globe valve assembly further may include a packing assembly threaded to the housing and a valve stem axially movable within the packing assembly. The valve member may be secured to an end of the valve stem. The balanced globe valve assembly further may comprise a seal positioned within the circumferential groove. The valve member may include a solid body having a top surface and a bottom surface, and the small opening may extend from the top surface to the bottom surface. The valve member further may have a second small opening formed therein. The valve member may be fabricated from a metal or metal alloy, and more specifically from brass or stainless steel. The cage may be configured to guide the movement of the valve member between the open and closed positions. The valve member may include a circumferential groove formed therein to receive the seal.

Another aspect of the disclosure is directed to a balanced globe valve assembly comprising a valve body defining flow passage between an inlet and an outlet thereof and a cage disposed within the valve body between the inlet and the outlet. The cage includes a valve seat and at least one port formed therein. The balanced globe valve assembly further comprises a balanced plug linearly movable relative to the valve seat within the cage for regulating a flow of fluid through the flow passage. The balanced plug is movable within the cage between an open position in which the balanced plug is spaced from the valve seat and a closed position in which the balanced plug is seated within the valve seat so that the balanced plug blocks the at least one port. The balanced plug including a solid body having a small opening formed therein between a top surface and a bottom surface to balance the balanced plug.

Embodiments of the balanced globe valve assembly further may include providing a balanced plug that is generally cylindrical in shape. The balanced plug may include a circumferential groove formed therein. The balanced globe valve assembly further may comprise a seal positioned within the circumferential groove. The seal may be an o-ring seal. The small opening may extend from the top surface to the bottom surface. The solid body further may include a second small opening formed therein. The balanced plug may be fabricated from a metal or a metal alloy, and more specifically from brass or stainless steel.

Another aspect of the present disclosure is directed to a method of controlling a flow of fluid through a balanced globe valve assembly. In one embodiment, the method comprises: moving a valve member disposed within a cage of a housing of the balanced globe valve assembly between an open position in which the valve member is spaced from a valve seat formed in the cage and a closed position in which the valve member is seated within the valve seat so that the valve member blocks at least one port formed in the cage; and balancing fluid pressure on opposite surfaces of the valve member through a small opening in the valve member. The valve member may include a solid body having a top surface and a bottom surface, and the small opening may extend from the top surface to the bottom surface.

BRIEF DESCRIPTION OF THE DRAWINGS

Various aspects of at least one embodiment are discussed below with reference to the accompanying figures, which are not intended to be drawn to scale. Where technical features are followed by references signs, the reference signs have been included for the sole purpose of increasing the intelligibility of the figures, detailed description, and claims. Accordingly, neither the reference signs nor their absence are intended to have any limiting effect on the scope of any claim elements. Each identical or nearly identical component that is illustrated in various figures is represented by a like numeral. For purposes of clarity, not every component may be labeled in every figure. The figures are provided for the purposes of illustration and explanation and are not intended as a definition of the limits of the disclosure. In the figures:

DETAILED DESCRIPTION

A balanced globe valve of embodiments of the present disclosure uses the same valve body of unbalanced globe valve designs, but requires less force to operate when compared to existing, unbalanced globe valve designs. The balanced globe valve incorporates a unique design that is similar to the solid plug design of unbalanced globe valves yet provides pressure balancing around a seat area of the valve to reduce forces to operate the valve. The balanced globe valve reduces close-off forces to a greater extent so that low-force actuators may be used in place of high-force actuators. Thus, larger valves, e.g., valves having one-inch or larger diameters, may be used with lower power actuators. Also, the balanced globe valve of the present disclosure can be rated for a higher system pressure, and still use the same actuator. As stated above, unbalanced globe valves need high power actuators which increases actuator cost and also restricted to systems with lower system pressures.

In one embodiment, a balancing hole in a metering disc or plug helps in achieving pressure balance in the valve when opening and closing the valve, and also throughout the travel of the plug within the valve. Due to same flow pressure on both sides of the plug, the force required to move the stem and plug assembly needs to overcome the packing friction in addition to the flow forces, if any. A typical globe valve requires seals in order to avoid any leakage when the valve is closed.

Figure 1:
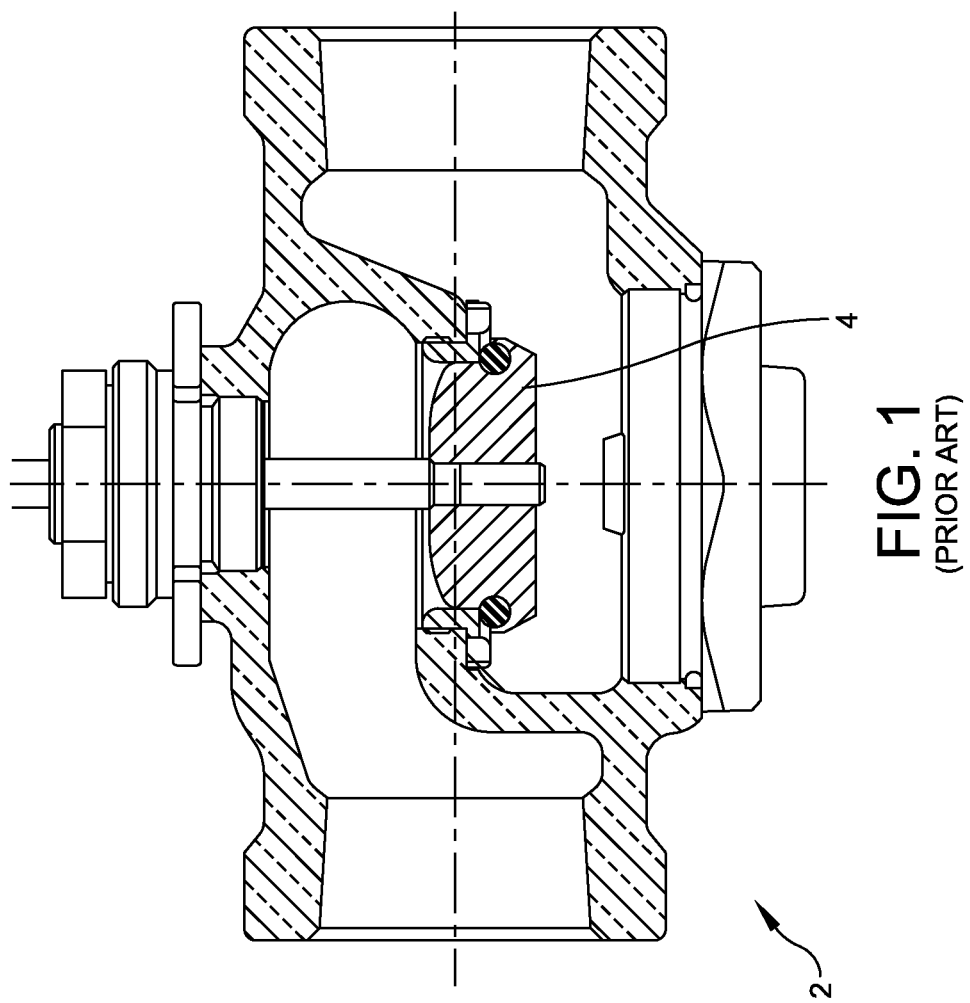
FIG. 1 is a cross-sectional view of a prior art unbalanced globe valve.
Figure 2:
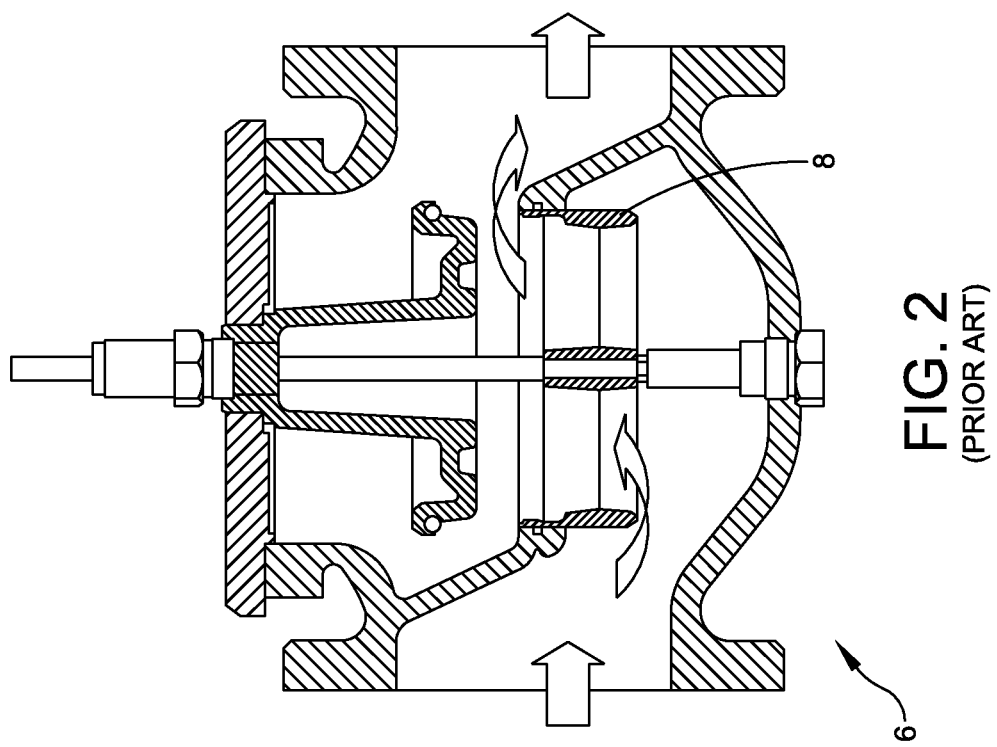
FIG. 2 is a cross-sectional view of a prior art balanced globe valve.
Figure 3:
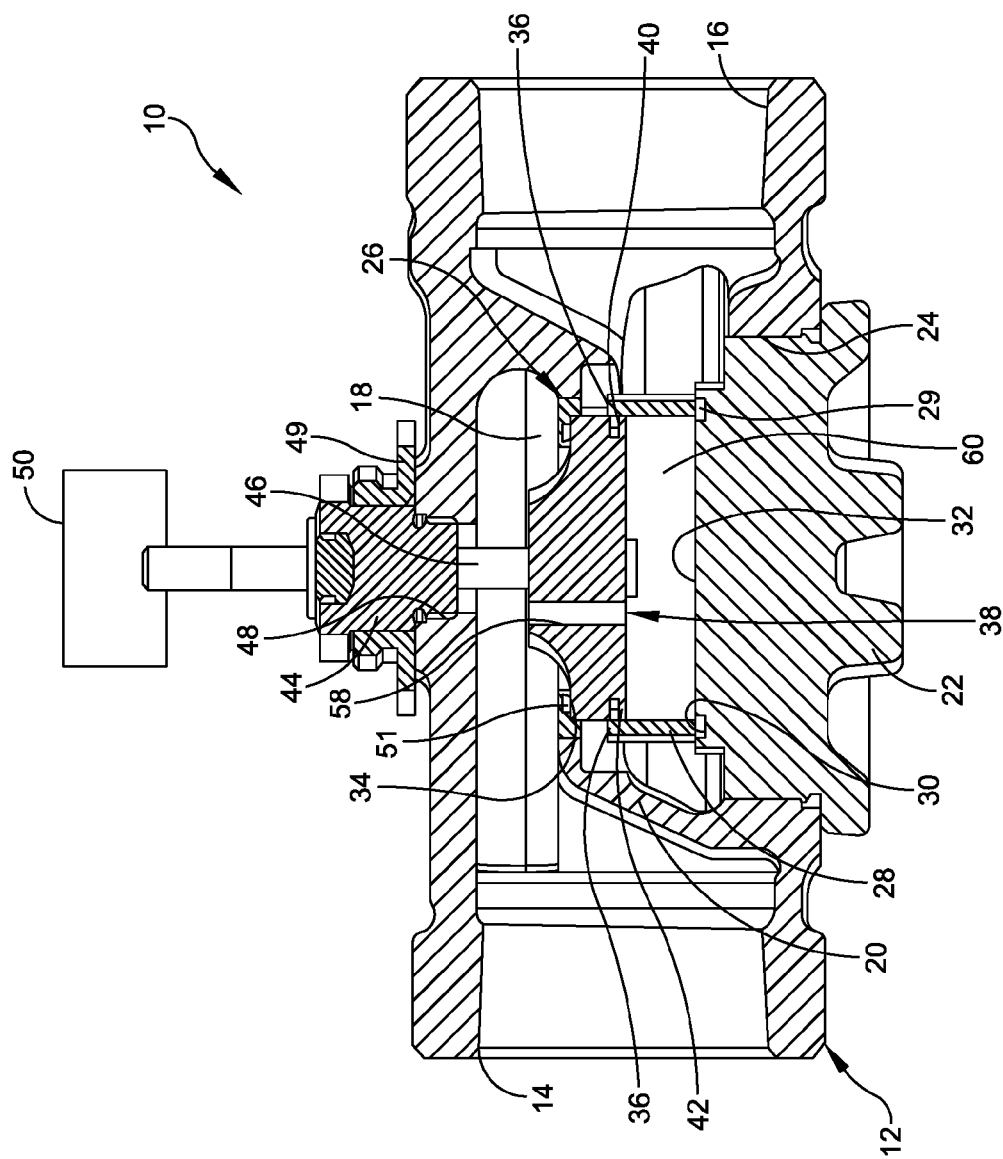
FIG. 3 is a cross-sectional view of a globe valve assembly of an embodiment of the disclosure that is predisposed in a normally closed position.
Figure 4:
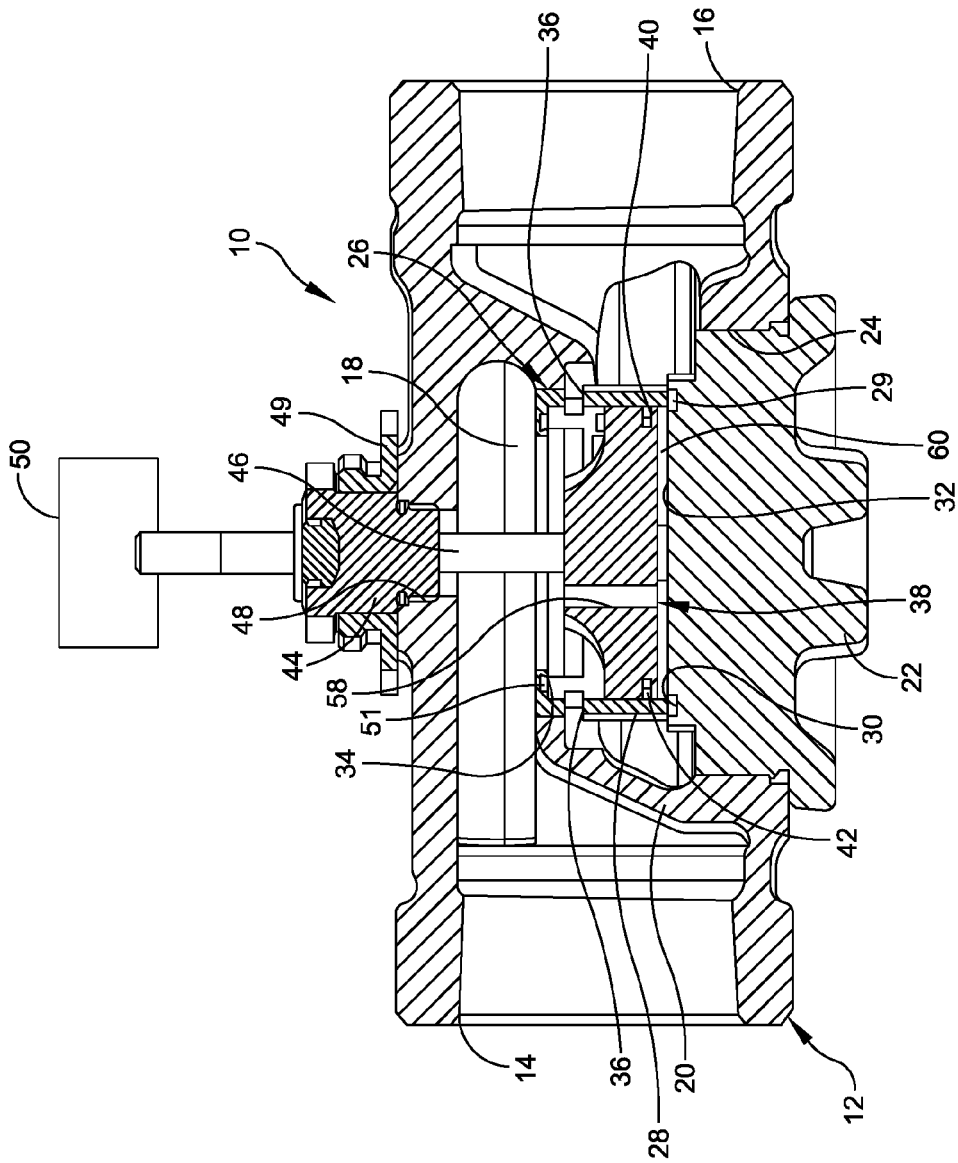
FIG. 4 is a cross-sectional view of the globe valve assembly shown in FIG. 3, with the plug of the globe valve assembly in a fully open position.

Referring now to the drawings, and more particularly to FIGS. 3 and 4, a normally closed balanced globe valve assembly, generally indicated at 10, is illustrated. FIG. 3 illustrates the valve assembly 10 in its normally closed position. FIG. 4 illustrates the valve assembly 10 in an open position. A typical globe valve is a two-port valve, meaning the globe valve has an inlet and an outlet, although a three port valve may also be provided. With a typical globe valve, the inlet and the outlet of the globe valve may be oriented straight across from each other or anywhere on the housing.

As shown, the balanced globe valve assembly 10 includes a valve body or housing, generally indicated at 12, which is fabricated from leaded red brass cast alloy (e.g., Oshalloy). In other embodiments, the housing 12 of the valve assembly 10 can be fabricated from a suitable metal or metal alloy, such as stainless steel. The housing 12 is constructed in a typical manner in which the housing includes an inlet 14 provided at one end of the housing, an outlet 16 provided at an opposite end of the housing, and a chamber 18 with a baffle 20, which is disposed between the inlet and the outlet. The housing 12 functions as the main pressure-containing structure of the valve assembly 10. The housing 12 is designed to contain or support all of the internal parts of the valve assembly 10, which contact the fluid being controlled by the valve.

In the shown embodiment, the balanced globe valve assembly 10 includes a bottom coupling 22 with threads, which can be assembled through a threaded opening 24 formed in the housing 12 below the chamber 18 of the housing. The bottom coupling 22 acts as a sealing joint when assembled with thread sealant. The bottom coupling 22 can be fabricated from any suitable metal or metal alloy, which provides access to the chamber 18 when the bottom coupling is removed from the housing 12.

The balanced globe valve assembly 10 further includes a cage, generally indicated at 26, which is disposed within the chamber 18 of the housing 12 between the inlet 14 and the outlet 16. As shown, the cage 26 includes an annular body 28, which is seated on a face seal 29 assembled within a recess 30 formed in an upper surface 32 of the bottom coupling 22. The cage 26 includes a valve seat 34 formed along an upper edge of the annular body 28 of the cage. The cage 26 further includes ports, each indicated at 36, formed in the annular body 28 below the valve seat 34 to enable fluid to flow through the cage when the valve assembly 10 is moved to an open position. In one embodiment, three ports 36 are provided, but the number of ports can vary depending on the size of the valve and the flow rate of the valve. The cage 26 is also fabricated from any suitable metal or metal alloy. The arrangement is such that when the valve assembly 10 is in an open position, fluid travels through the housing 12 via the inlet 14, through the ports 36 of the cage 26, and through the outlet 16. It should be understood that the sizes and number of ports 36 of the cage 26 may be modified to increase or decrease the amount of fluid flowing through the cage of the valve assembly 10.

The balanced globe valve assembly 10 further includes a valve member or balanced plug, generally indicated at 38, which is disposed within the cage 26, with the cage guiding the movement of the valve member during operation. As shown, the valve member 38 is movable within the cage 26 between a normally closed position in which the valve member is seated on the valve seat 34 of the cage so that the valve member blocks fluid communication between the ports 36 of the cage and the outlet 16 of the housing 12, and an open position in which the valve member is spaced from the valve seat to enable fluid communication between the ports of the cage and the outlet of the housing. As mentioned above, the cage 26 is designed to guide the movement of the valve member 38 during operation of the valve assembly 10.

In the embodiments shown in the drawings, the valve seat 34 may be beveled at a seating surface to provide support for a seal 51 in a dove tail groove, and to prevent the seal from becoming unseated when the valve member 38 is moved away from the seating surface. This rubber seal 51 is compressed when the valve member 38 is seated to provide a leak-tight shut off when the valve is closed. As shown, the valve member 38 includes a circumferential groove 40 formed therein. A seal 42 is positioned within the circumferential groove 40 to provide a seal between the valve member 38 and the annular body 28 of the cage 26.

As shown, the balanced globe valve assembly 10 includes a packing 44, which is threaded to the housing 12, and slid over a valve stem 46, which is axially movable within the packing. The valve member 38 is secured to an end of the valve stem 46, with the valve stem being configured to move the valve member upon actuating the valve stem. The packing 44 is threaded to the housing 12 within a threaded opening 48 provided at the top of the housing, opposite the bottom coupling 22. The packing 44 provides the containment of the material (fluid or gas) being controlled by the valve assembly 10. The packing 44 also contains packing material, which may embody a wearable material that performs a sealing function between the packing and the valve stem 46 during valve cycling. A locking nut 49 is slid over the packing 44 as shown, and is used to thread actuators to the valve with the external threads provided on the locking nut.

The balanced globe valve assembly 10 further includes an actuator 50, which is coupled to the valve stem 46 to move the valve member between the open and closed positions. In one embodiment, the actuator 50 may embody a manual actuator, such as a turn wheel capable of being manipulated by hand, to axially rotate the valve stem 46, thereby driving the movement of the valve member 38 between its closed and open positions. In another embodiment, the actuator 50 may embody an automatic actuator, which operates under the control of a controller. Smooth valve stems are surrounded by packing material to prevent leaking material from the valve. With a smooth valve stem, the ends of the valve stem are threaded to connect the valve member and the actuator to the valve stem.

Figure 5:
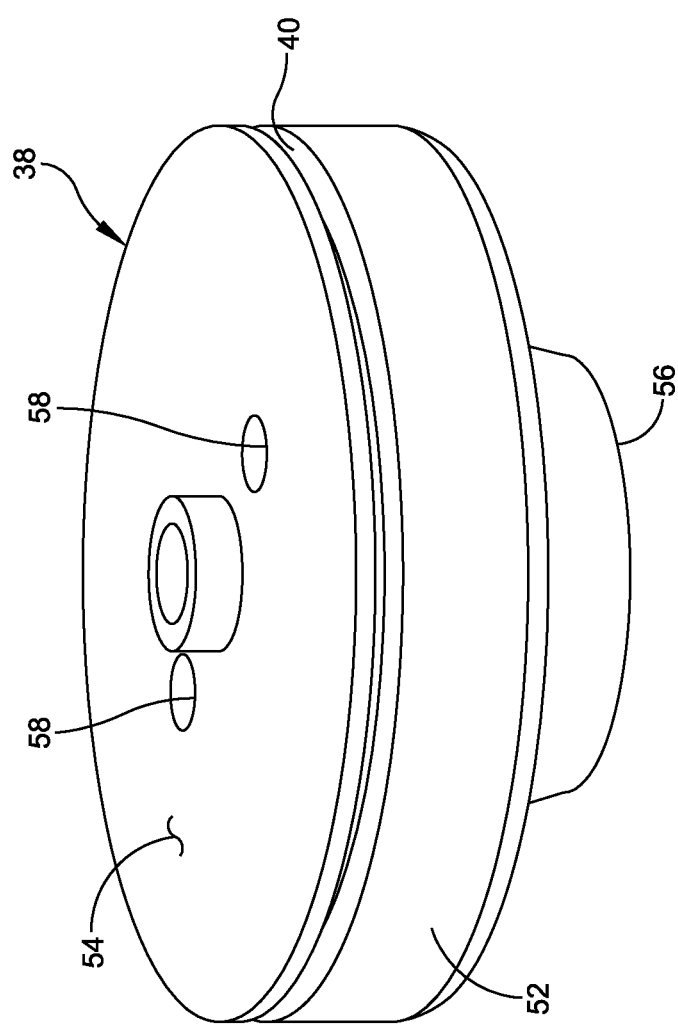
FIG. 5 is a perspective view of a plug of an embodiment of the present disclosure.

Referring additionally to FIG. 5, the valve member 38 includes a solid body 52 having a top surface 54 and a bottom surface 56. In one embodiment, the valve member 38 includes two small diameter openings, each indicated at 58, formed therein to balance the valve member, with the two small diameter openings extending from the top surface 54 to the bottom surface 56. In a certain embodiment, each small diameter opening 58 is sized depending on the size of the overall diameter of the valve member 38 and the valve size. As with the other components of the valve assembly 10, the valve member 38 is fabricated from a metal or metal alloy. In a particular embodiment, the valve member 38 is fabricated from brass. The openings 58 enable fluid to travel between the inlet 14 of the housing 12 to a space below the bottom surface 56 of the valve member 38 within the cage 26. Thus, both surfaces 54, 56 of the valve member 38 are subjected to the same fluid pressure during operation of the valve assembly 10. It should be understood that two small diameter openings 58 are provided to equalize the pressure between the top and bottom surfaces 54, 56 of the valve member 38.

During operation, the balanced globe valve assembly 10 is in its normally closed position in which fluid is prevented from flowing through the housing 12 of the valve assembly. This position is illustrated in FIG. 3. In the closed position, the surface 56 of the valve member 38 is exposed to fluid pressure from the inlet 14 of the housing 12 and functions as a sealing surface against the valve seat 34. The small diameter openings 58 formed in the valve member 38 balance the pressure applied on the surface 56 and the surface 54 of the valve member when the valve member is in the closed position. The valve member 38 is linearly movable relative to the valve seat 34 within the cage 26 to regulate a flow of fluid through the flow passage. To open the valve assembly 10, the actuator 50 is activated to move the valve member 38 away from the valve seat 34, thereby enabling fluid to flow between the inlet 14 of the housing 12 through the ports 36 of the cage 26 to the outlet of the housing. Fluid flows from the inlet 14 through the chamber 18 via the ports 36 of the cage 26 to the outlet 16. The size, shape and number of ports 36 in the cage 26 can be modified to change the flow rate of fluid through the valve assembly 10. To close the valve assembly 10, the actuator 50 is actuated again to move the valve member 38 toward the valve seat 34 to block the flow of fluid through the valve assembly. In this position, pressure on both sides of the valve member 38 is substantially equalized by the two small diameter openings 58 provided in the valve member 38 so that fluid travels to the space 60 within the cage 26 between the bottom coupling 22 and the surface 54 of the valve member.

Figure 6:
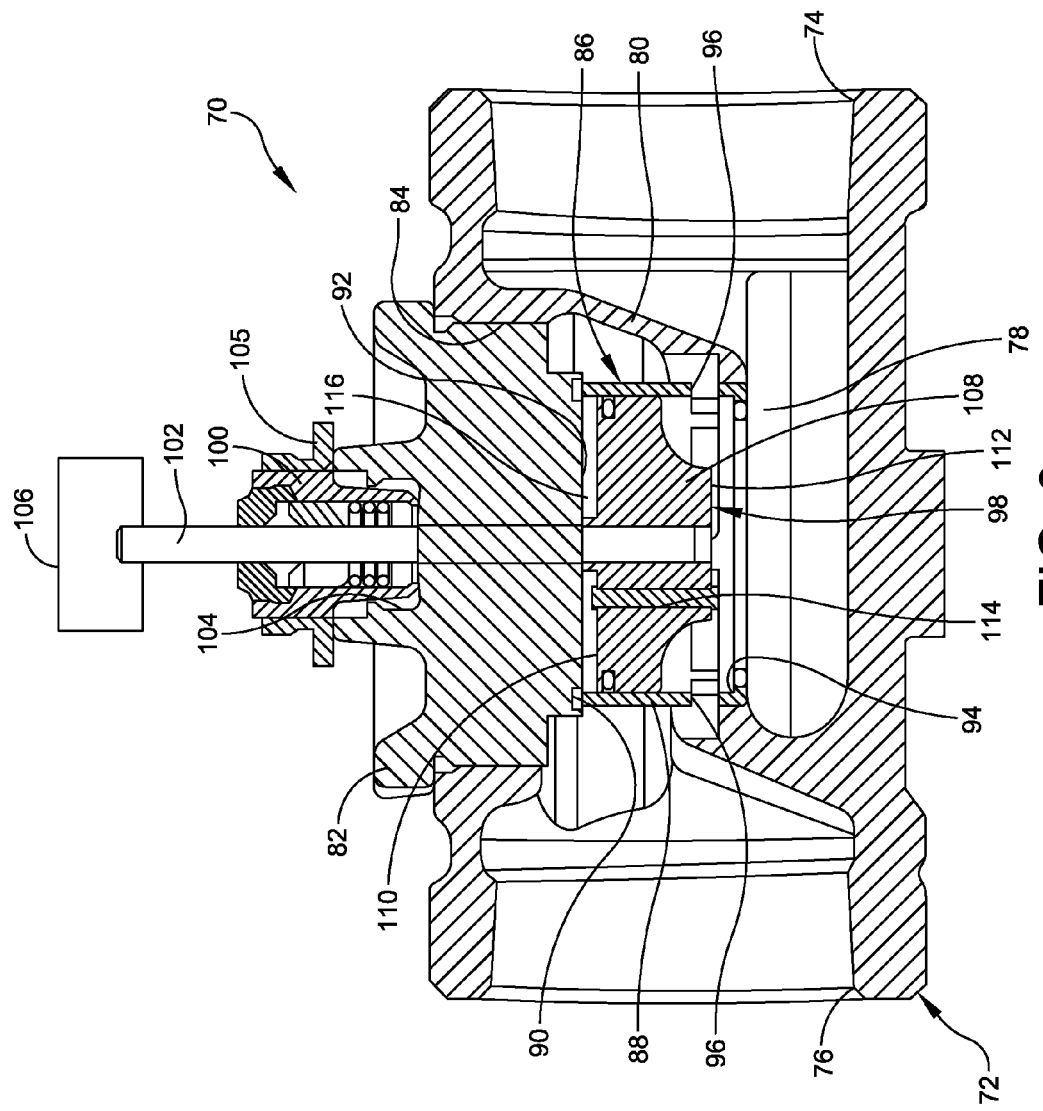
FIG. 6 is a cross-sectional view of a globe valve assembly of another embodiment of the disclosure that is predisposed in a normally open position.
Figure 7:
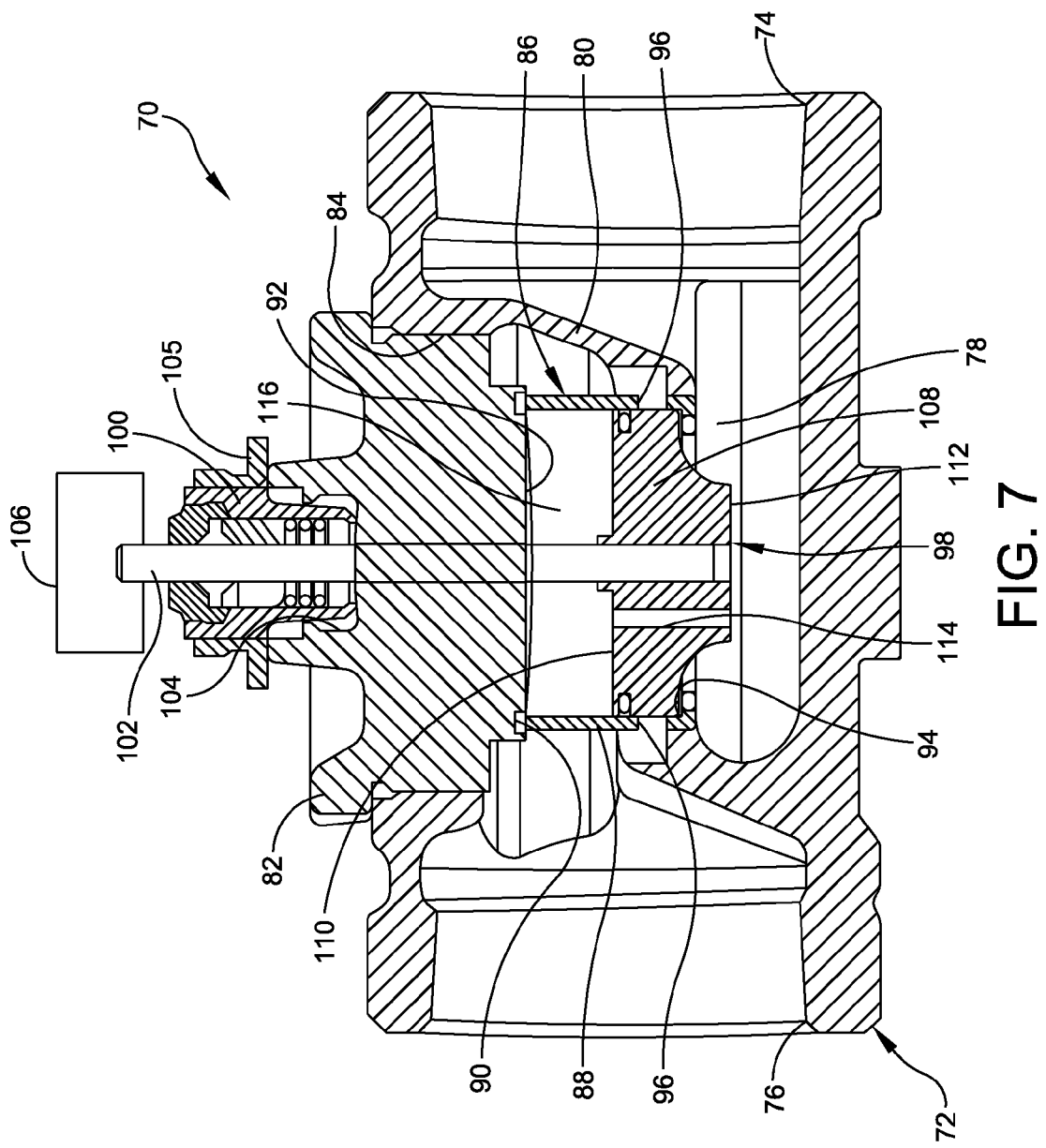
FIG. 7 is a cross-sectional view of the globe valve assembly shown in FIG. 5, with the plug of the globe valve assembly in a fully closed position.

Referring to FIGS. 6 and 7, a normally open balanced globe valve assembly is generally indicated at 70, with FIG. 6 showing the valve assembly in its normally open position and FIG. 7 showing the valve assembly in its closed position. Although the valve assembly 70 is shown to be a two-way glove valve, it should be understood, as with valve assembly 10, that the principles disclosed herein may be applied to three-way globe valves as well. As shown, the valve assembly 70 includes a valve body or housing, generally indicated at 72. The housing 72 includes an inlet 74 provided at one end of the housing, an outlet 76 provided at an opposite end of the housing, and a chamber 78 defined by a baffle 80, which is disposed between the inlet 74 and the outlet 76. The valve assembly 70 further includes a top coupling 82, which is threaded through an opening 84 formed in the housing 72 above the chamber 78 of the housing. The top coupling 82 acts as a sealing joint when it is threaded with adhesive to the housing 72. The top coupling 82 provides access to the chamber 78 when the top coupling is removed from the housing 72.

The balanced globe valve assembly 70 further includes a cage, generally indicated at 86, which is disposed within the chamber 78 of the housing 72 between the inlet 74 and the outlet 76. As shown, the cage 86 includes an annular body 88, which is seated in within a recess 90 formed in a bottom surface 92 of the top coupling 82. The cage 86 includes a valve seat 94 formed along a lower edge of the annular body 88 of the cage, and openings/ports, each indicated at 96, formed in the annular body above the valve seat to enable fluid to flow through the cage when the valve assembly 70 is in its normally open position. In one embodiment, three ports 96 are provided; however, any number of ports can be provided. The arrangement is such that when the valve assembly 70 is in its normally open position, fluid travels through the housing 72 via the inlet 74, through the ports 96 of the cage 86, and through the outlet 76. It should be understood that the sizes and number of ports 96 may be modified to increase or decrease the amount of fluid flowing through the cage 86 of the valve assembly 70.

The balanced globe valve assembly 70 further includes a valve member or balanced plug, generally indicated at 98, which is disposed within the cage 86 with the cage guiding the movement of the valve member during operation. As shown, the valve member 98 is movable within the cage 86 between a normally open position in which the valve member is spaced from the valve seat 94 to enable fluid communication between the ports 96 of the cage and the outlet 76 of the housing 72 and a closed position in which the valve member is seated within the valve seat of the cage so that the valve member blocks fluid communication between the ports of the cage and the outlet of the housing. As shown, the valve member 98 is constructed identically as valve member 38 of valve assembly 10.

As shown, the balanced globe valve assembly 70 includes a packing 100, which is threaded to the top coupling 82, such that a valve stem 102 is axially movable within the packing. The valve member 98 is secured to an end of the valve stem 102, with the valve stem being configured to move the valve member upon actuating the valve stem. The packing assembly 100 is threaded to the top coupling 82 through a threaded opening 104 provided in a top surface of the top coupling 82. The packing 100 provides the containment of the material (fluid or gas) being controlled by the valve assembly 70. The packing 100 also contains packing material, which may embody a wearable material that performs the sealing function between the packing and the valve stem 102 during valve cycling. A locking nut 105 is slid over the packing as shown and is used to thread actuators to the valve with the external threads provided on the locking nut.

The balanced globe valve assembly 70 further includes an actuator 106, which is coupled to the valve stem 102 to move the valve member 98 between the open and closed positions. In one embodiment, the actuator 106 may embody a manual actuator, such as a turn wheel, to axially move the valve stem 102, thereby driving the movement of the valve member 98 between its closed and open positions. In another embodiment, the actuator 106 may embody an automatic actuator, which operates under the control of a controller.

As with valve member 38, the valve member 98 of the balanced globe valve assembly 70 includes a solid body 108 having a top surface 110 and a bottom surface 112. The valve member 98 further includes two small diameter openings, each indicated at 114, formed in the solid body 108 to balance the valve member. The openings 114 enable fluid to travel between the inlet 74 of the housing 72 to a space 116 above the top surface 110 of the valve member 98 within the cage 86. Thus, both surfaces of the valve member 98 are subjected to the same fluid pressure during operation of the valve assembly 70.

During operation, the balanced globe valve assembly 70 is in its normally open position in which fluid is able to flow from the inlet 74 of the housing 72 to the outlet 76 of the housing, through the ports 96 provided in the cage 86. This position is illustrated in FIG. 6. In the open position, the valve member 98 is spaced from the valve seat 94. Fluid flows from the inlet 74 through the chamber 78 via the ports 96 of the cage 86 to the outlet 76. The size, shape and number of ports 96 in the cage 86 can be modified to change the flow rate of fluid through the valve assembly 70. To close the valve assembly 70, the actuator 106 is activated to move the valve member 98 toward the valve seat 94 so that the valve member is seated on the valve seat and provides as a leak-proof sealing joint. In the closed position, the bottom surface 112 of the valve member 98 is exposed to fluid pressure from the inlet 74 of the housing 72, and provides a sealing surface against the valve seat 94. The small diameter openings 114 formed in the valve member 98 balance the pressure applied on the top surface 110 and the bottom surface 112 of the valve member when the valve member is in the closed position. To close the valve assembly 70, the actuator 106 is actuated again to move the valve member 98 toward the valve seat 94 to block the flow of fluid through the valve assembly. In this position, pressure on both sides of the valve member 98 is substantially equalized by the two small diameter openings 114 provided in the valve member so that fluid travels to the small space 116 within the cage 86 between the top coupling 82 and the bottom surface 112 of the valve member, which reduces when the valve member is moved to its fully open position. Also, the valve member 98 may have a circumferential groove formed therein, similar to circumferential groove 40 for valve member 38, for an o-ring to avoid leakage. In addition, a seal groove is provided in the valve seat so that the seal becomes compressed against the valve member when seated to provide a leak-tight shut off in the closed position.

As mentioned, the housing and other components of the balanced globe valve assembly of embodiments of the present disclosure may be fabricated from a variety of metallic alloys, although suitably strong plastic materials may be used. The materials can be selected based on pressure, temperature, and controlled media properties. The packing material may be fabricated from a suitable low friction material. The valve member, or balanced plug as it is sometimes referred to, can be modified to meet the leakage, flow characteristic requirements and cost of the valve assembly. For example, smaller actuators may be used to reduce the actuator cost. Also, the design of the balanced globe valve assembly of embodiments of the present disclosure can use the same housing castings that are presently used since only the internal components are being changed, thereby preserving existing valve strokes and operating pressures.

The balanced globe valve assemblies as shown and described herein are two-port valves, although the principles disclosed herein can also be used for three-port valves. As shown, the valve assemblies are oriented with the ports straight across from each other; however, other orientations may also be provided, e.g., ninety degrees. The valve assemblies of embodiments disclosed herein can also have a Y-shaped body, which enables the construction of the valve to be straight at the bottom to allow fluid to pass through without difficulty and minimizes fluid clogging and/or corrosion.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A method of controlling a flow of fluid through a balanced globe valve assembly, the method comprising:

moving a valve member disposed within a cage of a housing of the balanced globe valve assembly between an open position in which the valve member is spaced from a valve seat formed in the cage and a closed position in which the valve member is seated within the valve seat so that the valve member blocks at least one port formed in the cage; and balancing fluid pressure on opposite surfaces of the valve member through an opening in the valve member;

wherein the valve member includes a solid body having a top surface and a bottom surface, the top surface being planar and having a top surface diameter measured about a top surface center;

wherein the opening extends from the top surface to the bottom surface;

wherein the opening has an opening diameter that is smaller than the top surface diameter and that has an opening center that is radially offset from the top surface center; and wherein the bottom surface has a bottom surface diameter that extends radially outward of a rubber seal supported on the valve seat, the bottom surface having a horizontally extending portion that engages the rubber seal when the valve member is in the closed position.

2. A balanced globe valve assembly comprising:
a housing having an inlet and an outlet;
a cage disposed within the housing between the inlet and the outlet, the cage including a valve seat and at least one port formed therein;
a valve member disposed within the cage and coupled to the housing, the valve member being movable within the cage between an open position in which the valve member is spaced from the valve seat and a closed position in which the valve member is seated within the valve seat so that the valve member blocks the at least one port, the valve member having an opening formed therein to balance the valve member; and
a rubber seal supported on the valve seat;
wherein the valve member includes a solid body having a top surface and a bottom surface, the top surface being planar and having a top surface diameter measured about a top surface center;
wherein the opening extends from the top surface to the bottom surface;
wherein the opening has an opening diameter that is smaller than the top surface diameter and has an opening center that is radially offset from the top surface center; and
wherein the bottom surface has a bottom surface diameter that extends radially outward of the rubber seal, the bottom surface having a horizontally extending portion that engages the rubber seal when the valve member is in the closed position.

3. The balanced globe valve assembly of claim 2, wherein the valve member further has a second opening formed therein.

4. The balanced globe valve assembly of claim 2, wherein the valve member is fabricated from a metal or metal alloy.

5. The balanced globe valve assembly of claim 2, wherein the valve member is fabricated from brass or stainless steel.

6. The balanced globe valve assembly of claim 2, further comprising a packing assembly threaded to the housing and a valve stem axially movable within the packing assembly, the valve member being secured to an end of the valve stem.

7. The balanced globe valve assembly of claim 2, wherein the cage is configured to guide the movement of the valve member between the open and closed positions.

8. The balanced globe valve assembly of claim 7, wherein the valve member includes a circumferential groove formed therein.

9. The balanced globe valve assembly of claim 8, further comprising a seal positioned within the circumferential groove.

10. A balanced globe valve assembly comprising:
a valve body defining flow passage between an inlet and an outlet thereof;
a cage disposed within the valve body between the inlet and the outlet, the cage including a valve seat and at least one port formed therein; and
a balanced plug linearly movable relative to the valve seat within the cage for regulating a flow of fluid through the flow passage, the balanced plug being movable within the cage between an open position in which the balanced plug is spaced from the valve seat and a closed position in which the balanced plug is seated within the valve seat so that the balanced plug blocks the at least one port, the balanced plug including a solid body having an opening formed therein between a top surface and a bottom surface to balance the balanced plug;
a rubber seal supported on the valve seat;
wherein the top surface is planar and has a top surface diameter measured about a top surface center;
wherein the opening extends from the top surface to the bottom surface;
wherein the opening has an opening diameter that is smaller than the top surface diameter and has an opening center that is radially offset from the top surface center; and
wherein the bottom surface has a bottom surface diameter that extends radially outward of the rubber seal, the bottom surface having a horizontally extending portion that engages the rubber seal when the valve member is in the closed position.

11. The balanced globe valve assembly of claim 10, wherein the balanced plug is generally cylindrical in shape.

12. The balanced globe valve assembly of claim 11, wherein the balanced plug includes a circumferential groove formed therein.

13. The balanced globe valve assembly of claim 12, further comprising a seal positioned within the circumferential groove.

14. The balanced globe valve assembly of claim 13, wherein the seal is an o-ring seal.

15. The balanced globe valve assembly of claim 10, wherein the solid body further includes a second small opening formed therein.

16. The balanced globe valve assembly of claim 10, wherein the balanced plug is fabricated from a metal or a metal alloy.

17. The balanced globe valve assembly of claim 10, wherein the balanced plug is fabricated from brass or stainless steel.

* * * * *